(12) United States Patent
Campbell

(10) Patent No.: US 11,574,801 B1
(45) Date of Patent: Feb. 7, 2023

(54) METHODS AND SYSTEMS FOR MASS SPECTROMETRY ANALYSIS UTILIZING HYDROGEN-DEUTERIUM EXCHANGE

(71) Applicant: DH Technologies Development PTE. LTD., Singapore (SG)

(72) Inventor: John Lawrence Campbell, Milton (CA)

(73) Assignee: DH Technologies Development Pte. Ltd., Singapore (SG)

( * ) Notice: Subject to any disclaimer, the term of this patent is extended or adjusted under 35 U.S.C. 154(b) by 434 days.

(21) Appl. No.: 16/887,940

(22) Filed: May 29, 2020

Related U.S. Application Data

(60) Provisional application No. 62/855,772, filed on May 31, 2019.

(51) Int. Cl.
*H01J 49/00* (2006.01)
*H01J 49/16* (2006.01)
*H01J 49/24* (2006.01)
*H01J 49/04* (2006.01)
*H01J 49/42* (2006.01)

(52) U.S. Cl.
CPC ........ *H01J 49/0031* (2013.01); *H01J 49/004* (2013.01); *H01J 49/0468* (2013.01); *H01J 49/165* (2013.01); *H01J 49/24* (2013.01); *H01J 49/42* (2013.01)

(58) Field of Classification Search
None
See application file for complete search history.

(56) References Cited

FOREIGN PATENT DOCUMENTS

CA    2758917 A1 * 10/2010 .......... H01J 49/0077
RU    2599330 C1 *  10/2016

* cited by examiner

*Primary Examiner* — Andrew Smyth

(57) ABSTRACT

Systems and methods are disclosed for utilizing an ion mobility cell to improve desolvation prior to interaction with a hydrogen-deuterium exchange reagent, thereby improving the accuracy of the HDX data generated by MS and reducing the effects of conformational changes that can occur with increased temperatures.

20 Claims, 5 Drawing Sheets

METHODS AND SYSTEMS FOR MASS SPECTROMETRY ANALYSIS UTILIZING HYDROGEN-DEUTERIUM EXCHANGE

RELATED APPLICATIONS

This application claims the benefit of priority from U.S. provisional application 62/855,772, filed on May 31, 2019, the entire contents of which is incorporated by reference herein.

FIELD

The invention generally relates to mass spectrometry, and more particularly to methods and apparatus using ion mobility spectrometry for performing hydrogen-deuterium exchange reactions.

INTRODUCTION

Hydrogen-deuterium exchange (also referred to herein as HDX) is a chemical reaction in which a covalently bonded hydrogen atom is replaced by a deuterium atom. Because mass spectrometry (MS) can distinguish ions based on small changes in their mass-to-charge ratio (m/z), HDX has been used in conjunction with MS-based analysis in order to determine the locations and/or relative amounts of the heavier deuteriums that have been incorporated into an analyte of interest. Monitoring the dynamics of the HDX reactions can be especially useful in studying the various levels of chemical structures, including primary (e.g., differentiating isomers), secondary (e.g., identifying intramolecular hydrogen bonds), and tertiary (e.g., identifying conformational changes resulting from protein-ligand and protein-protein interactions).

However, implementation of gas-phase HDX in mass spectrometers can present issues because the ion/molecule reactions responsible for the replacement of deuterium atoms for labile hydrogen atoms can be influenced by many factors such as temperature, reagent flow rate, volatility, etc. Accordingly, there remains a need for improved processes for promoting and/or monitoring HDX processes in MS-based systems.

SUMMARY

In a typical electrospray ionization (ESI) process, a liquid sample containing an analyte of interest is discharged into an ionization chamber via an electrically conductive needle, electrospray electrode, or nozzle, while an electric potential difference between the electrospray electrode and a counter electrode generates a strong electric field within the ionization chamber that electrically charges the liquid sample. The electric field generated within the ionization chamber causes the liquid discharged from the electrospray electrode to disperse into a plurality of charged micro-droplets drawn toward the counter electrode if the charge imposed on the liquid's surface is strong enough to overcome the surface tension of the liquid. As solvent within the micro-droplets evaporates during desolvation in the ionization chamber, charged analyte ions can enter a sampling orifice of the counter electrode for subsequent mass spectrometric analysis.

Applicant has discovered, however, that attempts to perform gas-phase HDX with the analyte ions prior to complete desolvation can interfere with deuterium incorporation. In particular, it has been found that unevaporated solvent molecules associated with the ions following ESI can serve as a barrier for the HDX reagent, thereby resulting in lower than expected deuterium incorporation. While the temperature of the ionization chamber or the electrospray electrode itself may be increased to quicken evaporation of the solvent, such attempts to promote desolvation can also result in unreliable HDX data. For example, higher desolvation temperatures can lead to unintended conformational changes in the structure of the analyte ions (e.g., alteration of the tertiary structure of a folded protein or polynucleotide) such that labile protons normally-buried within the folded protein or polynucleotide may be undesirably exchanged following exposure to HDX reagent.

In accordance with various aspects of the present teachings, systems and methods described herein utilize an ion mobility cell to improve desolvation prior to interaction with the HDX reagent, thereby improving the accuracy of the HDX data and reducing the effects of conformational changes that can occur with increased temperatures, for example.

In accordance with some aspects, certain embodiments of the applicant's teachings relate to a method for analyzing a sample containing or suspected of containing an analyte of interest. According to the method, a liquid sample is discharged from an ion source so as to form a plurality of charged micro-droplets comprising one or more analyte ions and a solvent such that the charged micro-droplets are introduced into a chamber through an orifice of a curtain plate of an ion mobility cell, the curtain plate partially defining a chamber containing a plurality of spaced electrodes, wherein the plurality of spaced electrodes provide a volume therebetween defining a path for ions from an entrance end adjacent the curtain plate to an exit end adjacent an orifice plate that separates the chamber from a vacuum chamber containing one or more mass analyzers. A curtain gas comprising a desolvating reagent is introduced into a first region of the chamber located between the curtain plate and the entrance end such that at least a portion of the curtain gas and the charged micro-droplets are transported between the plurality of electrodes so as to desolvate solvent within the charged micro-droplets. In addition, a throttle gas comprising a HDX reagent is introduced into a second region of the chamber located between the exit end and the orifice plate. The analyte ions are transported from the exit end through the second region and into the vacuum chamber via an orifice in the orifice plate. In certain aspects, the analyte ions can interact with the HDX reagent as they pass through the second region. For example, in some aspects, transporting the analyte ions through the second region containing the HDX reagent comprises replacing one or more protons of at least one analyte ion with deuterium.

The desolvation reagent, HDX reagent, and solvent can comprise various compounds. By way of non-limiting example, in some implementations the desolvation reagent comprises one of acetone and acetonitrile, the HDX reagent comprises one of heavy water ($D_2O$) and deuterated methanol ($CD_3OD$), and/or the solvent comprises one of water and methanol. Additionally or alternatively, in some aspects the analyte ions are anions or ionized oligonucleotides, by way of non-limiting example.

In some aspects, the liquid sample is discharged into an ionization chamber in fluid communication with the chamber via the orifice of the curtain plate, wherein the temperature of the chamber does not exceed about 300° C.

The ion mobility cell can have a variety of configurations. By way of non-limiting example, the ion mobility cell can comprise a differential mobility spectrometer (DMS), also known as a high-field asymmetric ion mobility spectrometer (FAIMS). In certain aspects, the plurality of spaced electrodes of the ion mobility cell comprise planar surfaces that are separated by a fixed distance, and wherein a voltage source is configured to provide an asymmetric voltage source to the plurality of spaced electrodes for generating an asymmetric field in the volume between the planar surfaces. In certain aspects, the ion mobility cell can function simply as an ion guide (having no ion mobility separation qualities enabled), wherein it serves only as a conduit by which desolvation and HDX reagents can be introduced to the analyte ions.

In certain aspects, a mass spectrometry system is provided comprising an ion source configured to discharge a liquid sample into an ionization chamber so as to form a plurality of charged micro-droplets comprising one or more analyte ions and a solvent; a curtain plate separating the ionization chamber from a chamber, the curtain plate defining an orifice through which the micro-droplets pass from the ionization chamber to the chamber; a plurality of spaced electrodes disposed within said chamber, wherein the plurality of spaced electrodes provide a volume therebetween defining a path for the analyte ions from an entrance end adjacent the curtain plate to an exit end; an orifice plate adjacent the exit end and separating the chamber from a vacuum chamber configured to contain one or more mass analyzers, wherein the chamber and vacuum chamber are in fluid communication via an orifice in the orifice plate; a first gas source configured to introduce a curtain gas comprising a desolvating agent into a first region located between the curtain plate and the entrance end; and a second gas source configured to introduce a throttle gas comprising a HDX reagent into a second region located between the exit end and the orifice plate. For example, in some aspects, the HDX reagent is configured to replace one or more protons of the analyte ions with deuterium as the analyte ions are transported through the second region and into the vacuum chamber.

In various aspects, the system can additionally include one or more heaters configured to heat the ionization chamber and/or the chamber such that the temperature of the chamber does not exceed about 300° C.

In certain aspects, an ion mobility cell is provided comprising a chamber; two or more spaced electrodes disposed within the chamber, the two or more spaced electrodes separated by a fixed distance defining a volume therebetween providing a path for ions from an entrance end through which charged micro-droplets comprising one or more analyte ions and solvent are received from an ionization chamber to an exit end through which analyte ions are transmitted to a vacuum chamber; a voltage source configured to provide an asymmetric voltage source to the two more spaced electrodes for generating an asymmetric field in the volume therebetween; a first gas source configured to introduce a curtain gas comprising a desolvating agent into a first region of the chamber configured to be located between the entrance end and an orifice in fluid communication with the ionization chamber; and a second gas source configured to introduce a throttle gas comprising a HDX agent into a second region of the chamber configured to be located between the exit end and an orifice in fluid communication with the vacuum chamber.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

Improved systems and methods are provided herein for performing HDX reactions prior to MS-based analysis of target analytes. Whereas conventional techniques for gas-phase HDX can suffer from insufficient desolvation prior to the HDX reaction or conformational changes to the folded analyte's structure such that normally-buried labile protons are exposed—each of which can result in unreliable MS data regarding the amount and/or location of deuterium incorporation—the present teachings introduce a desolvating reagent at the front end of an ion mobility cell to improve desolvation before reacting the analyte ions with an HDX reagent at the back end of the ion mobility cell.

Figure 1:
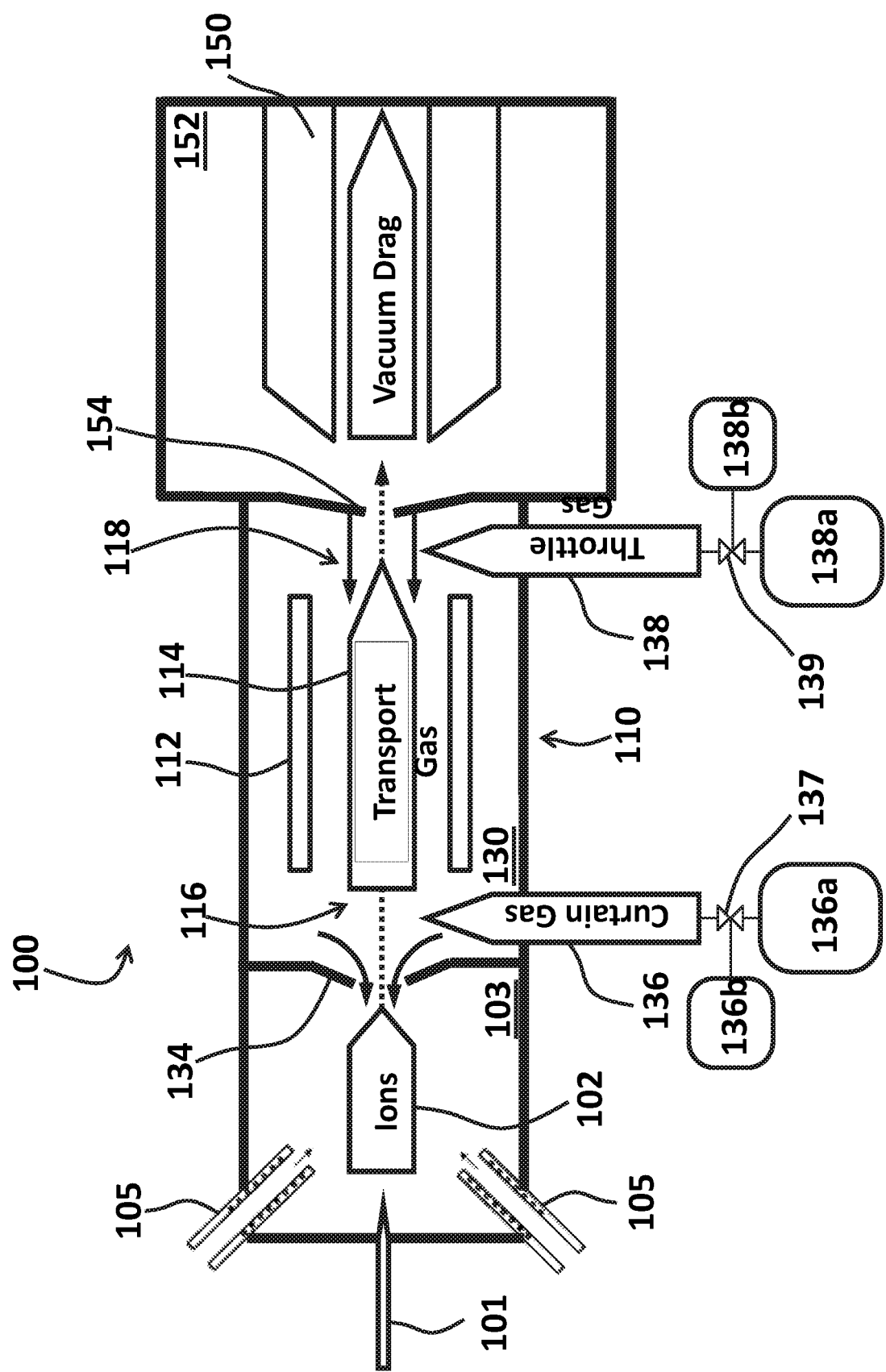
FIG. 1, in a schematic diagram, illustrates an exemplary differential mobility spectrometer/mass spectrometer system including a curtain gas supply and a throttle gas supply in accordance with an aspect of various embodiments of the applicant's teachings.

With reference now to FIG. 1, an exemplary system 100 for performing HDX reactions prior to MS-based analysis of target analytes in accordance with various aspects of applicant's teachings is illustrated schematically. As shown in FIG. 1, the system 100 generally comprises an ion source 101 in fluid communication with an ion mobility cell 110 and a first vacuum lens element 150 of a mass spectrometer (hereinafter generally designated mass spectrometer 150). As will be appreciated by a person skilled in the art, the depicted system 100 represents only one possible configuration for use in accordance with various aspects of the systems, devices, and methods described herein.

The ion source 101 can have a variety of configurations but is generally configured to generate ions from a liquid sample containing or suspected of containing an analyte of interest. By way of example, the ion source 101 can generate sample ions from a solvent (e.g., water, methanol) containing analytes stored within a sample source (e.g., a reservoir). In the exemplary embodiment depicted in FIG. 1, the ion source 101 comprises a capillary in fluid communication with a sample source (not shown) and that terminates in an outlet end that at least partially extends into the ionization chamber 103 and discharges a fluid therein. As will be appreciated by a person skilled in the art, the outlet end can atomize, aerosolize, nebulize, or otherwise discharge (e.g., spray with a nozzle) the liquid sample into the ionization chamber 103 to form a sample plume 102 comprising a plurality of micro-droplets containing one or more of the analyte molecules and liquid solvent that are generally directed toward the orifice of the curtain plate aperture 134. As is known in the art, analyte molecules contained within the micro-droplets can be ionized (i.e., charged) by the ion source 101, for example, as the sample plume 102 is generated. By way of non-limiting example, the outlet end of the ion source 101 can be made of a conductive material and electrically coupled to a pole of a voltage source (not shown). Micro-droplets contained within the sample plume 102 can thus be charged by the voltage applied to the outlet end such that as solvent within the droplets evaporates during desolvation in the ionization chamber 103, the charged analyte ions are drawn toward and through the orifice in the curtain plate 134. It should be appreciated that any number of different ionization techniques known in the art can be utilized as the ion source 101 in accordance with the present teachings. By way of non-limiting example, the ion source 101 can be an electrospray ionization (ESI) device, an atmospheric pressure chemical ionization (APCI) device, a nebulizer assisted electrospray device, a chemical ionization device, a nebulizer assisted atomization device, an inductively coupled plasma (ICP) ion source, a matrix-assisted laser desorption/ionization (MALDI) ion device, a glow discharge ion device, an electron impact ion device, a chemical ionization device, a thermospray ionization device, a sonic spray ionization device, or a photoionization device, among others.

As shown in FIG. 1, the exemplary system 100 optionally includes one or more heaters 105 for heating the ionization chamber 103 and/or chamber 130 to promote desolvation of the solvent within the sample plume 102. By way of example, the heaters 105 can provide a flow of heated gas to the ionization chamber 103 so as to raise the temperature therein to a temperature in a range of from about 100° C. to about 800° C. Additionally or alternatively, the ion source 101 itself can be heated, for example, by heating the capillary through which the liquid sample is transported and discharged into the ionization chamber 103. Though higher temperatures may promote quicker evaporation to reduce the effects of insufficient desolvation as otherwise discussed herein, applicant has found that excessive heating of the ionization chamber 103, chamber 130, and/or liquid sample can also lead to deleterious effects on HDX results due to the unfolding of the analyte's tertiary structure. For example, because HDX reactions are utilized to monitor the incorporation of deuterium to determine the number and/or location of labile protons in complex, folded oligonucleotides or peptides, excessive heating that causes analyte molecules to "unwind" from their typical conformation may allow for HDX at locations that would not typically be exposed to the HDX reagent. Accordingly, applicant has discovered that sufficient desolvation can nonetheless be accomplished, for example, in the absence of a heated ionization chamber 103 or when the heaters 105 are configured to heat the ionization chamber 103 and/or chamber 130 to a temperature that does not exceed about 300° C.

The ion mobility cell 110 can have a variety of configurations, but is generally configured to resolve ions based on their mobility through a fixed or variable electric field (whereas MS analyzes ions based on their mass-to-charge ratios). For example, the mobility spectrometer can be an ion mobility spectrometer, a differential mobility spectrometer, a drift-time ion mobility spectrometer, traveling wave ion mobility spectrometry (TWIMS) device, trapped ion mobility spectrometry, or high-field asymmetric waveform ion mobility spectrometry (FAIMS) devices of various geometries such as parallel plate, curved electrode, or cylindrical FAIMS device, among others. In differential mobility spectrometry, for example, RF voltages, often referred to as separation voltages (SV), are applied across the drift tube in a direction perpendicular to that of a drift gas flow. Ions of a given species tend to migrate radially away from the axis of the transport chamber by a characteristic amount during each cycle of the RF waveform due to differences in mobility during the high field and low field portions of the RF signal. A DC potential, commonly referred to as a compensation voltage (CV or CoV), applied to the drift tube provides a counterbalancing electrostatic force to that of the SV. The CV can be tuned so as to preferentially prevent the drift of a species of ion of interest. Depending on the application, the CV can be set to a fixed value to pass only ion species with a particular differential mobility while the remaining species of ions drift toward the electrodes and are neutralized. Alternatively, if the CV is scanned for a fixed SV as a sample is introduced continuously into the DMS, a mobility spectrum can be produced as the DMS transmits ions of different differential mobilities. It will be noted that although applicant utilizes an ion mobility cell as discussed otherwise herein that can utilize SV/CV directed to the particular analyte of interest, it is contemplated that the ion mobility cell may be operated without the application of an asymmetric voltage. That is, ion mobility cells in accordance with various aspects of the present teachings may be utilized for their provision of regions for particular gas-phase chemistries (e.g., an upstream region for providing a desolvating reagent, a downstream region for providing a HDX reagent) and a flow path between the electrodes of the ion mobility cell during which the desolvating agent may remove solvent that interferes with HDX.

In the exemplary embodiment depicted in FIG. 1, the ion mobility cell 110 includes a chamber 130 that is separated from the ionization chamber 103 by a curtain plate or boundary member 134 that defines an orifice through which ions are received from the ionization chamber 103. In this exemplary embodiment, the chamber 130 surrounds a pair of electrode plates 112 having opposed planar surfaces defining a volume therebetween that provides a path for the transport gas 114 that drifts from an inlet end 116 of the electrode plates 112 to an outlet end 118 of the electrode plates 112 as the SV and CV are applied thereto. The outlet end 118 releases the transport gas 114 and ions transported thereby into an inlet 154 of a vacuum chamber 152 containing the mass spectrometer 150.

As shown in FIG. 1, a curtain gas 136 from a curtain gas supply 136a is supplied to the front end of the chamber 130, for example, in a region between the curtain plate 134 and the inlet end 116 of the electrodes 112. The curtain gas 136 can be set to flow rates determined by a flow controller (not shown) and one or more valves 137 so as to control the pressure within the chamber 130 and/or to alter the drift time of ions within the ion mobility cell 110. The pressure of the chamber 130 can be maintained, for example, at or near atmospheric pressure (i.e., 760 Torr) and can provide both a curtain gas outflow out of the curtain plate 154 (e.g., to keep debris from entering the orifice) as well as a curtain gas inflow that becomes the transport gas 114 that carries the ions 102 between the electrodes 112 and into the mass spectrometer 150 contained within the vacuum chamber 152. By way of non-limiting example, the vacuum chamber 152 can be maintained at a pressure lower than that of the chamber 130 (e.g., by a vacuum pump) so as to drag the transport gas 114 and ions entrained therein into the inlet 154 of the mass spectrometer 150.

The curtain gas supply 136a can provide a pure or mixed composition of carrier gas to the chamber 130. By way of non-limiting example, the curtain gas supply 136a can comprise a tank of air, $O_2$, He, $N_2$, $CO_2$, or any combination thereof. As shown, the system 100 additionally includes a desolvating reagent supply 136b for supplying to the carrier gas provided by the curtain gas supply 136a a reagent configured to help evaporate solvent within the micro-droplets as the ions traverse the ion mobility cell 110 in accordance with the present teachings. A person skilled in the art will appreciate that the desolvating reagent can be added to the carrier gas via a variety of mechanisms known in the art, for example, by bubbling the gas provided by the carrier gas supply 136a through the desolvating reagent, by nebulizing the desolvating reagent into the carrier gas, or by being incorporated into the curtain gas supply 136a itself, by way of non-limiting example. In some aspects, for example, the one or more valves 137 can be controlled so as to change the concentration of the desolvating reagent within the curtain gas 136. The concentration of the desolvating reagent(s) can be controlled to be less than 5% (v/v, mole ratio, e.g., about 1.5%), by way of non-limiting example.

In accordance with various aspects of the present teachings, the desolvating reagent can comprise any reagent capable of being delivered with the carrier gas for chemically removing solvent molecules associated with the analyte ions that could interfere with interaction with the HDX reagent, as discussed below. By way of non-limiting example, polar aprotic molecules, including but not limited to acetates, ketones, nitriles would be suitable for use in accordance with the present teachings if such compounds would not interfere with the HDX and/or the subsequent mass spectrometric analysis. As discussed below with reference to the exemplary data presented in FIGS. 2-5, acetone and/or acetonitrile, for example, are particularly beneficial in helping "strip" any water or methanol molecules associated with the analyte RNA anions as they traverse the ion mobility cell 110. Without being bound by any particular theory, it is believed that using acetone and/or acetonitrile allows these desolvating reagents to bind to the negatively charged oligonucleotide ions and thus displace the ESI solvent during transport in the ion mobility cell 110, thereby allowing for more reliable HDX interactions and subsequent MS-based determinations.

With reference again to FIG. 1, the ion mobility cell 110 also includes a throttle gas supply 138a for supplying a throttle gas 138 to the downstream end of the chamber 130, for example, in a region between the outlet end 118 of the electrodes 112 and the inlet 154 of vacuum chamber 152. As with the curtain gas 136, the throttle gas 138 can be set to flow rates determined by a flow controller and one or more valves 139 so as to control the pressure within the chamber 130 and/or to alter the drift time of ions within the ion mobility cell 110. By way of example, it will be appreciated that increasing the flow rate of the throttle gas 138 can be effective to decrease the velocity of the transport gas 114 of the analyte ions through the ion mobility cell 110. In this manner and in accordance with various aspects of the present teachings, the flow rate of the throttle gas 138 can be increased so as to allow for increased desolvation time within the ion mobility cell 110.

The throttle gas supply 138a can also provide a pure or mixed composition of carrier gas to the region at the downstream end of the chamber 130. By way of non-limiting example, the throttle gas supply 138a can comprise a tank of air, $O_2$, He, $N_2$, $CO_2$, or any combination thereof. As shown, the system 100 additionally includes a HDX reagent supply 138b for supplying to the carrier gas provided by the throttle gas supply 138a a HDX reagent configured to interact with the analyte ions as they are dragged within the transport gas 114 from between the electrodes 112 and into the mass spectrometer 150 contained within the vacuum chamber 152. A person skilled in the art will appreciate that the HDX reagent can be added to the carrier gas via a variety of mechanisms known in the art, for example, as discussed above with reference to the curtain gas 136. Similarly, the one or more valves 139 can be controlled so as to change the concentration of the HDX reagent within the throttle gas 138, depending for example on the kinetics of the HDX reaction and the transport time of ions within and through the second region.

It will be appreciated in light of the present teachings that the HDX reagent can comprise any reagent capable of being delivered with the carrier gas for replacing one or more protons of at least one of the analyte ions with deuterium. By way of non-limiting example, compounds suitable for use in accordance with the present teachings include heavy water ($D_2O$) and deuterated methanol ($CD_3OD$). By way of non-limiting example, compounds suitable for use in accordance with the present teachings as desolvating reagents include polar aprotic molecules, including but not limited to acetates, ketones, nitriles.

Ions transmitted by the ion mobility cell 110 can be sent to one or more downstream mass analyzer elements 150 for detection and/or further analysis. For example, as will be appreciated by a person skilled in the art, the ion mobility/mass spectrometer system 100 can include one or more additional mass analyzer elements within or downstream from vacuum chamber 152. For example, ions can be transported through one or more additional differentially pumped vacuum stages containing one or more mass analyzer elements. For instance, in one embodiment, a triple quadrupole mass spectrometer comprising three differentially pumped vacuum stages can be utilized, the stages including a first stage maintained at a pressure of approximately 2.3 Torr, a second stage maintained at a pressure of approximately 6 mTorr, and a third stage maintained at a pressure of approximately $10^{-5}$ Torr. The third vacuum stage can contain a detector, as well as two quadrupole mass analyzers with a collision cell located between them. It will be apparent to those skilled in the art that there may be a number of other ion optical elements in the system. Alternatively, a detector (e.g., a Faraday cup or other ion current measuring device) effective to detect the ions transmitted by the ion mobility cell 110 can be disposed directly at the outlet of the chamber 130.

Accordingly, in operation, a liquid sample containing or suspected of containing an analyte can be discharged from an ion source 101 so as to form a plume 102 of charged micro-droplets comprising one or more analyte ions and a solvent. Charged micro-droplets introduced through the orifice of a curtain plate 134 are transported through a curtain gas comprising a desolvating reagent at the upstream end of the electrodes 112 and transported therebetween such that the desolvating reagent can evaporate solvent associated with the analyte ions that would interfere with HDX. In this manner, as the analyte ions are transported from between the electrodes 112 to the vacuum chamber 152 through the region of the chamber 130 within which throttle gas containing HDX reagent has been introduced, the analyte ions can be exposed to the HDX reagent. The location and/or amount of hydrogen-deuterium exchange can thereafter be determined by one or more mass analyzers 150 and detectors utilizing mass spectrometric techniques including MS and MS/MS.

Examples

The applicant's teachings can be even more fully understood with reference to the following examples and data presented in FIGS. 2-5, which demonstrate the improved incorporation of deuterium following HDX reactions utilizing exemplary systems and methods in accordance with various aspects of the present teachings.

Figure 2A:
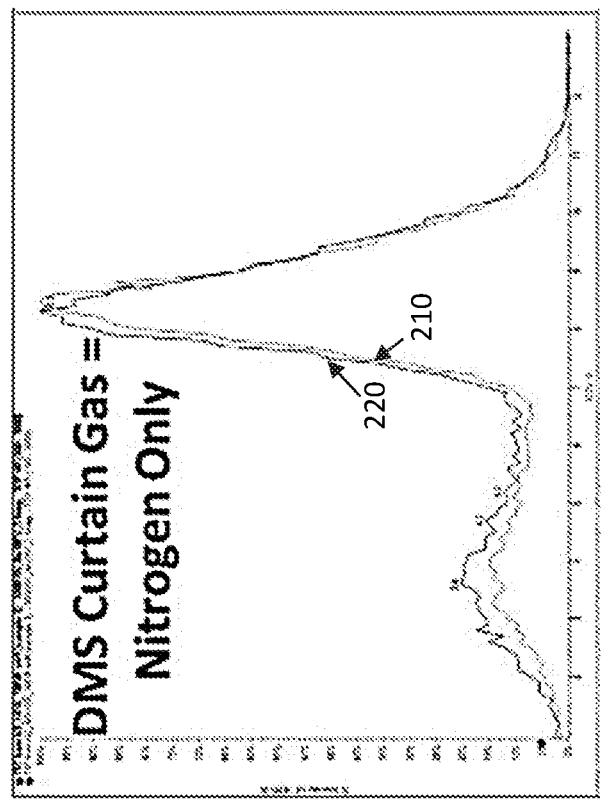
FIGS. 2A and 2B depict data when operating a DMS with no modifier being added to the curtain gas, with and without HDX reagent being added to the throttle gas.

A differential mobility spectrometer (SelexION™, SCIEX, Concord, ON) system (Noestheden et al., "Rapid characterization of naphthenic acids using differential mobility spectrometry and mass spectrometry," *Environ. Sci. Technol.* 2014, 48, 10264-10272) was mounted on a research-grade quadrupole time-of-flight mass spectrometer (SCIEX), between a TurboV™ ESI source operating in negative ion mode and the mass spectrometer's sampling orifice. The experimental analyte was a 22-mer RNA molecule (5'-GGUGACGCCGUAAGGCGCAGCC-3') dissolved in water/methanol solvent (500 ng/mL), with all of the RNA ions exhibiting several charge states (e.g., −10 to −5) across experiments following ionization. The DMS cell was maintained at a temperature of 150° C. and the various modifiers if any (i.e., none (FIGS. 2A-B), isopropanol (FIGS. 3A-B), acetone (FIGS. 4A-B), acetonitrile (FIGS. 5A-B)) were added to the DMS curtain gas ($N_2$) at 1.5% levels (mole ratio), if any. In order to generate FIGS. 2A, 3A, 4A, and 5A, which depict the total intensity of ions transmitted by the DMS with HDX reagent (220, 320, 420, 520) and without HDX (210, 310,410, 510) being present in the throttle gas, the SV was maintained at 3000 V, while the CV was scanned from −12 V to +7 VV in 0.25-V increments to determine the optimum SV/CV pair for transmission from the DMS for each of the curtain gas modifiers, if any. In comparing FIGS. 2A, 3A, 4A, and 5A, it will be noted that the use of acetone (FIG. 4A, max intensity at about +2 V) and acetonitrile (FIG. 5A, max intensity at about −3 V) provide a negative CV shift relative to the case in which no modifier is used (FIG. 2A, max intensity at about +9 V). Without being bound by any particular theory, this relative negative shift suggests that the acetone/acetonitrile molecules themselves bind to the negatively charged analyte ions, thus displacing the water/methanol solvent molecules.

Figure 2B:
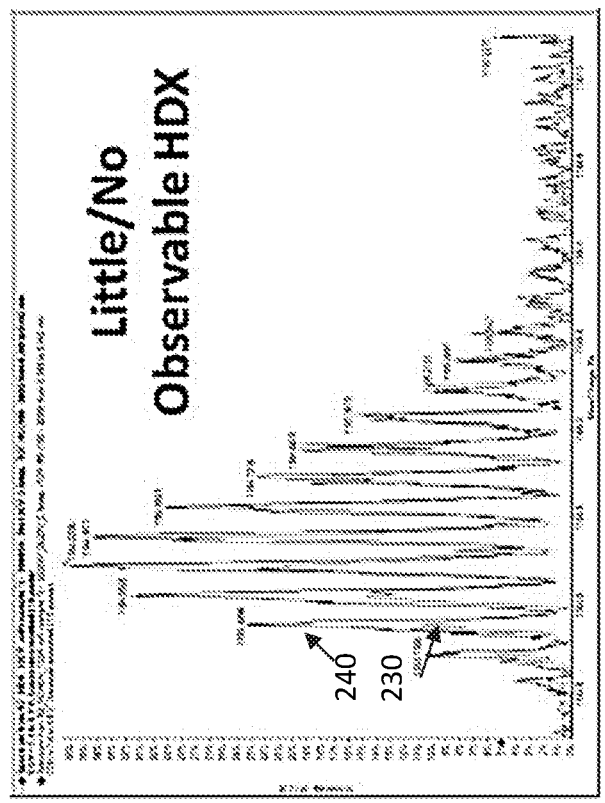
Figure 3B:
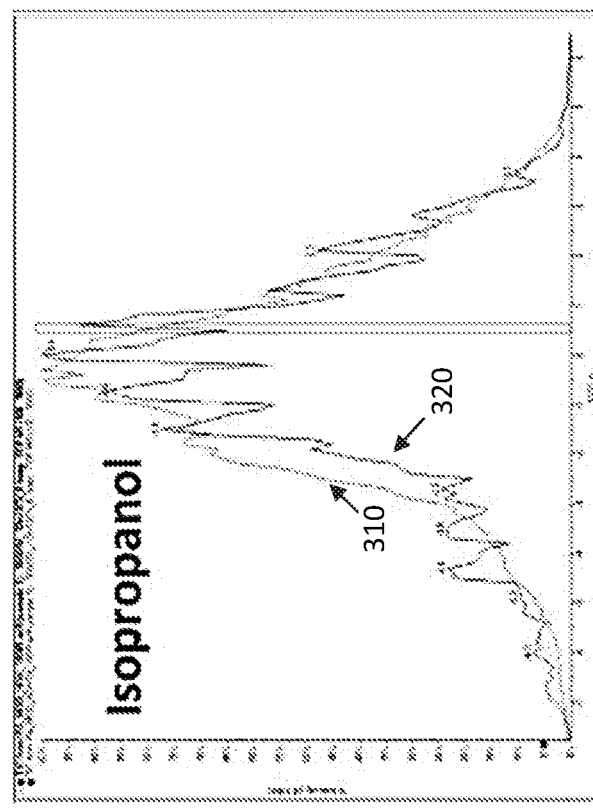
FIGS. 3A and 3B depict data when operating a DMS with isopropanol being added to the curtain gas, with and without HDX reagent being added to the throttle gas.
Figure 3A:
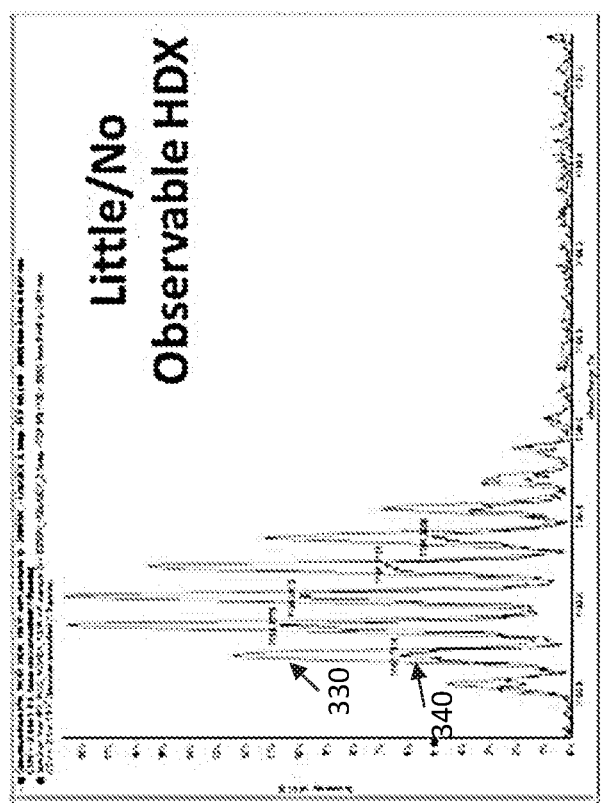
Figure 4A:
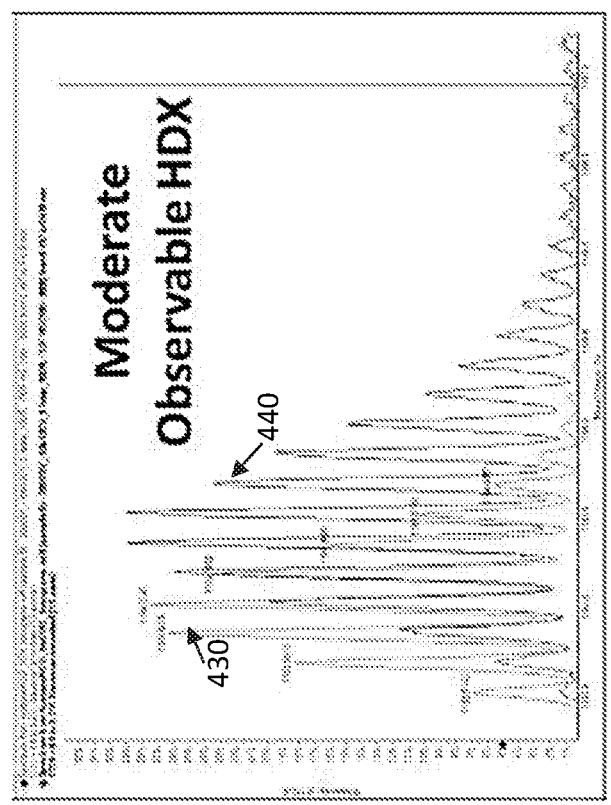
FIGS. 4A and 4B depict data when operating a DMS with acetone being added to the curtain gas, with and without HDX reagent being added to the throttle gas.
Figure 4B:
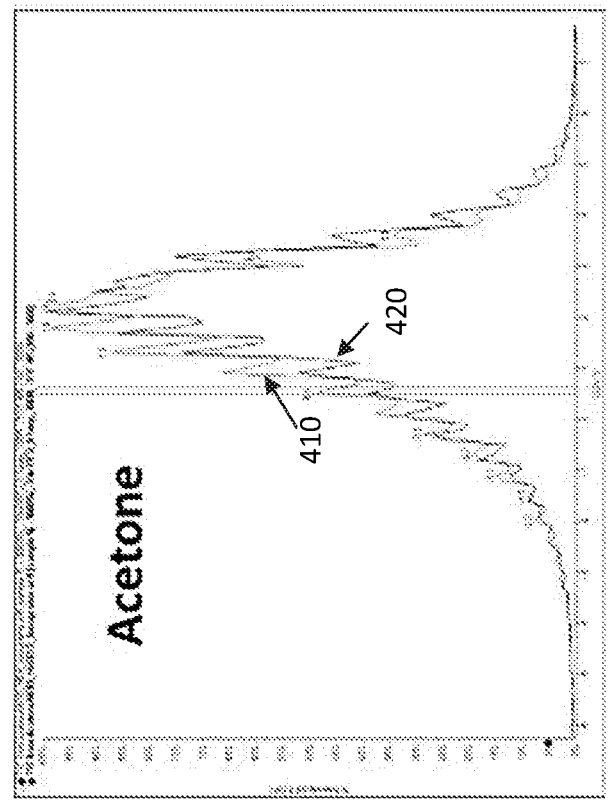
Figure 5B:
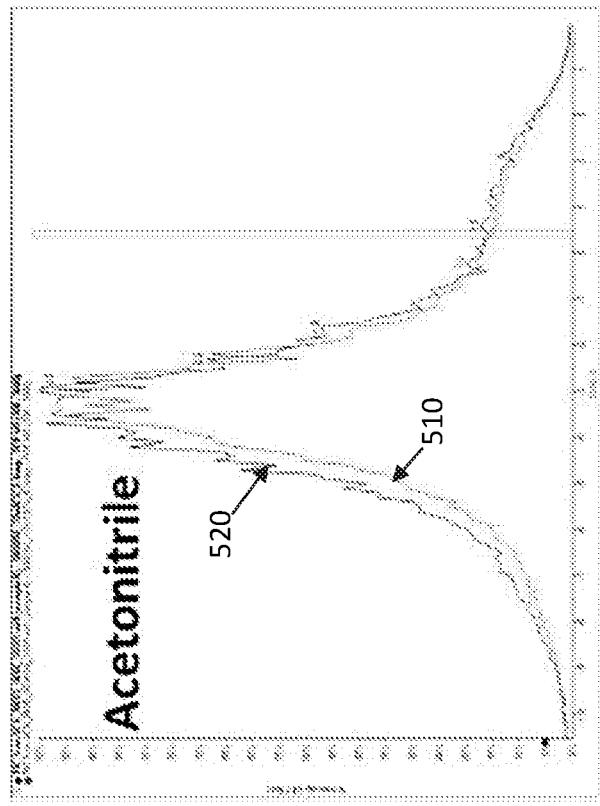
FIGS. 5A and 5B depict data when operating a DMS with acetonitrile being added to the curtain gas, with and without HDX reagent being added to the throttle gas.
Figure 5A:
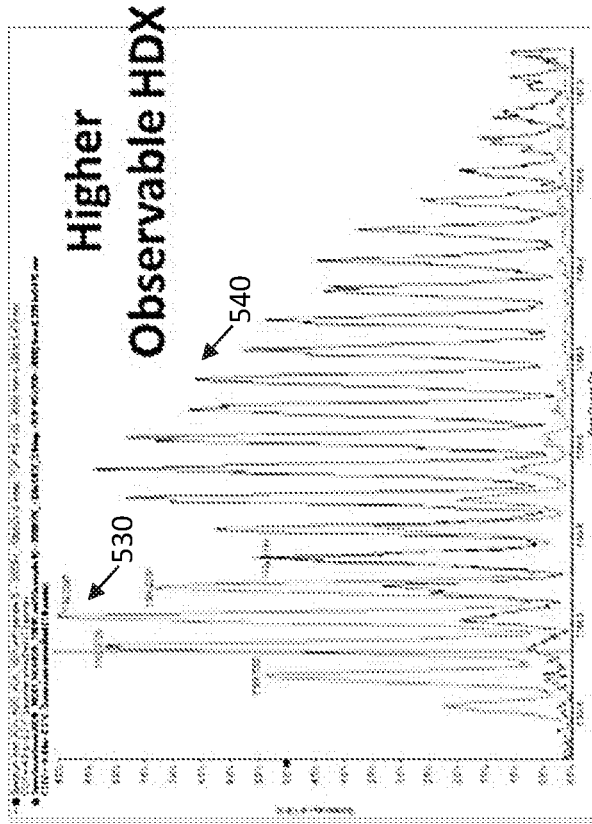

For FIGS. 2B, 3B, 4B, and 5B, the same experimental conditions were used as above except that the CV was set to the maximum transmission of FIGS. 2A, 3A, 4A, and 5A, respectively. The intensity of the transmitted analyte ions at various m/z ratios was detected, with HDX reagent (240, 340, 440, 540) and without HDX reagent (230, 330, 430, 530) being added to the throttle gas ($N_2$). With reference first to FIG. 2B, it will be observed that the aligned m/z peaks and similar peak intensities regardless of the presence of HDX reagent indicate that little to no deuterium incorporation was achieved when there was no modifier in the curtain gas. Indeed, the relatively decreased intensity of the peaks when isopropanol was added to the curtain gas and HDX was present (FIG. 3B, 340) suggest that this protic solvent engages in hydrogen bonding with the RNA anions, thereby forming a "shell" around the RNA anions to block HDX from occurring. On the other hand, for FIG. 4B (acetone) and FIG. 5B (acetonitrile), moderate and high HDX was observed as seen in the consistent shift in the peaks to higher m/z with and without the HDX reagent present due to the replacement of labile hydrogens with the heavier deuterium nuclei. This indicates that relative to the use of nitrogen only as the curtain gas, acetone and acetonitrile were both effective to help desolvate the analyte ions in the DMS, thereby removing the interference of the solvent with the HDX reagent.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. A method for analyzing a sample containing or suspected of containing an analyte, comprising:
   discharging a liquid sample from an ion source so as to form a plurality of charged micro-droplets comprising one or more analyte ions and a solvent;
   introducing the charged micro-droplets through an orifice of a curtain plate of an ion mobility cell, the curtain plate partially defining a chamber containing a plurality of spaced electrodes, wherein the plurality of spaced electrodes provide a volume therebetween defining a path for ions from an entrance end adjacent the curtain plate to an exit end adjacent an orifice plate that separates the chamber from a vacuum chamber containing one or more mass analyzers;
   introducing a curtain gas comprising a desolvating reagent into a first region of the chamber located between the curtain plate and the entrance end;
   transporting at least a portion of the curtain gas and the charged micro-droplets along the path between the plurality of electrodes so as to desolvate solvent within the charged micro-droplets;
   introducing a throttle gas comprising a hydrogen-deuterium exchange reagent into a second region of the chamber located between the exit end and the orifice plate; and
   transporting the analyte ions through the second region and into the vacuum chamber via an orifice in the orifice plate.

2. The method of claim 1, wherein transporting the analyte ions through the second region containing the hydrogen-deuterium exchange reagent comprises replacing one or more protons of at least one of the analyte ions with deuterium.

3. The method of claim 1, wherein the liquid sample is discharged into an ionization chamber in fluid communication with the chamber via the orifice of the curtain plate, wherein the temperature of the ionization chamber does not exceed about 300° C.

4. The method of claim 1, wherein the desolvating reagent comprises one of an acetate, ketone, and nitrile.

5. The method of claim 1, wherein the hydrogen-deuterium exchange reagent comprises one of heavy water ($D_2O$) and deuterated methanol ($CD_3OD$).

6. The method of claim 1, wherein the solvent comprises one of water and methanol.

7. The method of claim 1, wherein the plurality of spaced electrodes comprise planar surfaces that are separated by a fixed distance, and wherein a voltage source is configured to provide an asymmetric voltage source to the plurality of spaced electrodes for generating an asymmetric field in the volume between the planar surfaces.

8. The method of claim 1, wherein the analyte ions comprise anions.

9. The method of claim 1, wherein the analyte ions comprise oligonucleotides.

10. The method of claim 1, wherein the ion mobility cell comprises DMS.

11. A mass spectrometry system, comprising:
an ion source configured to discharge a liquid sample into an ionization chamber so as to form a plurality of charged micro-droplets comprising one or more analyte ions and a solvent;
a curtain plate separating the ionization chamber from a chamber, the curtain plate defining an orifice through which the micro-droplets pass from the ionization chamber to the chamber;
a plurality of spaced electrodes disposed within said chamber, wherein the plurality of spaced electrodes provide a volume therebetween defining a path for the analyte ions from an entrance end adjacent the curtain plate to an exit end;
an orifice plate adjacent the exit end and separating the chamber from a vacuum chamber configured to contain one or more mass analyzers, wherein the chamber and vacuum chamber are in fluid communication via an orifice in the orifice plate;
a first gas source configured to introduce a curtain gas comprising a desolvating reagent into a first region located between the curtain plate and the entrance end; and
a second gas source configured to introduce a throttle gas comprising a hydrogen-deuterium exchange reagent into a second region located between the exit end and the orifice plate.

12. The system of claim 11, wherein the plurality of spaced electrodes comprise planar surfaces separated by a fixed distance.

13. The system of claim 12, further comprising a voltage source configured to provide an asymmetric voltage source to the plurality of spaced electrodes for generating an asymmetric field in the volume between the planar surfaces.

14. The system of claim 11, wherein the hydrogen-deuterium exchange reagent is configured to replace one or more protons of the analyte ions with deuterium as the analyte ions are transported through the second region and into the vacuum chamber.

15. The system of claim 11, further comprising one or more heaters configured to heat the ionization chamber to a temperature that does not exceed about 300° C.

16. The system of claim 11, wherein the desolvating reagent comprises one of an acetate, ketone, and nitrile.

17. The system of claim 11, wherein the hydrogen-deuterium exchange reagent comprises one of heavy water ($D_2O$) and deuterated methanol ($CD_3OD$).

18. The system of claim 11, wherein the analyte ions comprise oligonucleotides.

19. The system of claim 11, wherein the ion mobility cell comprises DMS.

20. An ion mobility cell, comprising:
a chamber;
two or more spaced electrodes disposed within the chamber, the two or more spaced electrodes separated by a fixed distance defining a volume therebetween providing a path for ions from an entrance end through which charged micro-droplets comprising one or more analyte ions and solvent are received from an ionization chamber to an exit end through which analyte ions are transmitted to a vacuum chamber housing one or more mass analyzers;
a voltage source configured to provide an asymmetric voltage source to the two more spaced electrodes for generating an asymmetric field in the volume therebetween;
a first gas source configured to introduce a curtain gas comprising a desolvating reagent into a first region of the chamber configured to be located between the entrance end and an orifice in fluid communication with the ionization chamber; and
a second gas source configured to introduce a throttle gas comprising a hydrogen-deuterium exchange reagent into a second region of the chamber configured to be located between the exit end and an orifice in fluid communication with the vacuum chamber.

* * * * *